May 26, 1936.  A. R. HAVANAS  2,042,097
PORTABLE SHEET MATERIAL CUTTER
Filed Dec. 31, 1935   3 Sheets-Sheet 1.
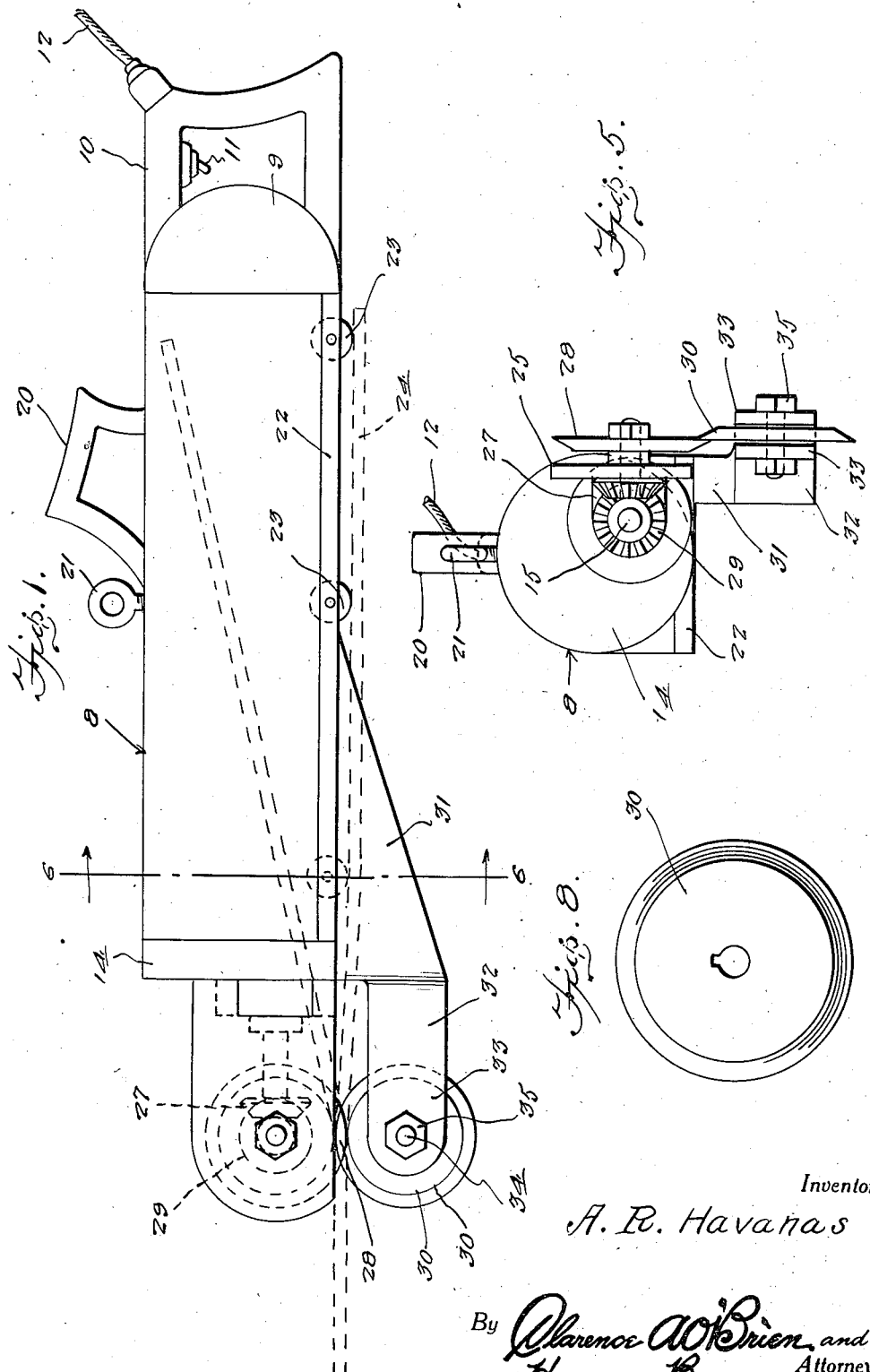
Inventors
A. R. Havanas
By Clarence A O'Brien and
Hyman Berman  Attorneys May 26, 1936.  A. R. HAVANAS  2,042,097
PORTABLE SHEET MATERIAL CUTTER
Filed Dec. 31, 1935   3 Sheets-Sheet 2
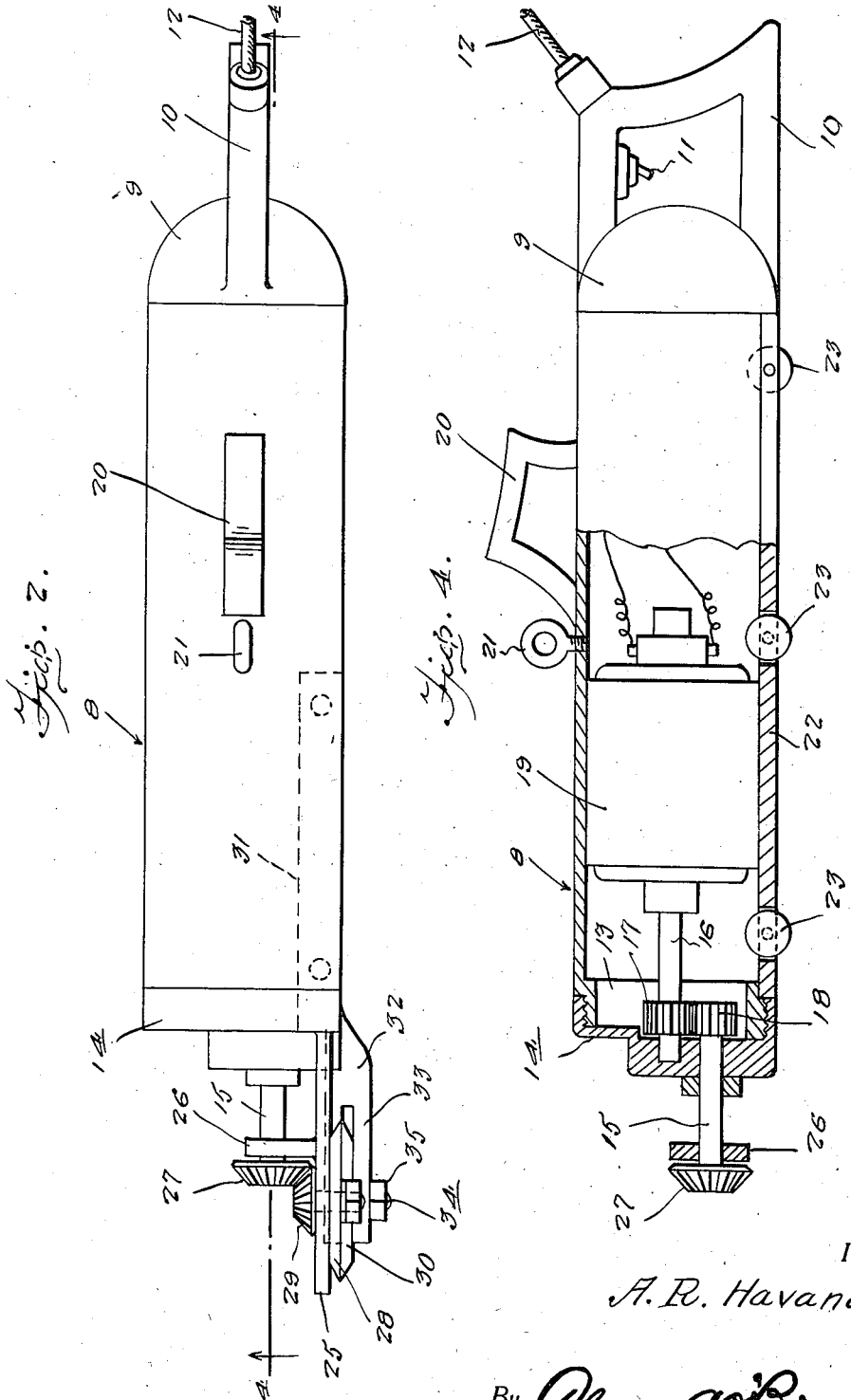
Inventors
A. R. Havanas
By Clarence A. O'Brien and
Hyman Berman
Attorneys

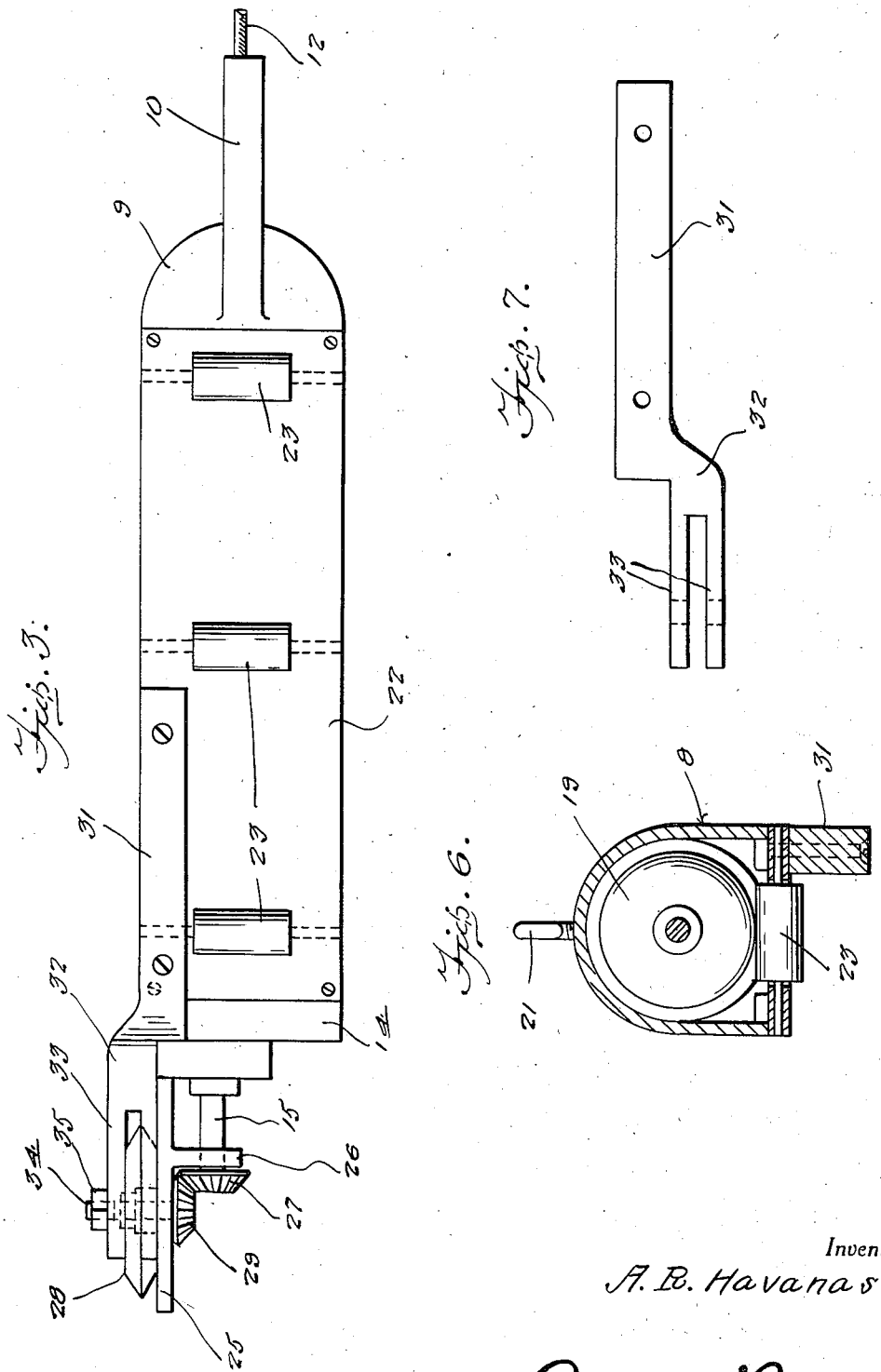

Patented May 26, 1936

2,042,097

UNITED STATES PATENT OFFICE 2,042,097

PORTABLE SHEET MATERIAL CUTTER

Albert R. Havanas, Warren, Ohio, assignor of one-half to Donald McDermott, Warren, Ohio Application December 31, 1935, Serial No. 57,052

5 Claims. (Cl. 164—84)

This invention relates to a portable bench tool resembling an electrically operated hand plane but expressly constructed for cutting sheet material, particularly sheet steel and equivalent metal.

My primary aim, as is evident, is to do away with manually controlled mechanical shears and similar cutting implements and to substitute therefor a conveniently handled electric motor driven structure equipped with properly allocated complemental cutting disks for keenly and accurately severing sheet steel and equivalent metal.

Briefly, the preferred embodiment of the invention comprises a handle equipped electric motor casing provided with rollers whereby it may be satisfactorily maneuvered, the cutting means being located at the front end of the casing and embodying a positive gear driven main cutting disk and an idling companion cutter disk, these disks being appropriately associated and co-ordinated to provide the quick cutting or severing of the sheet which is fed between their peripheral portions.

Novelty may reside, in one instance, in the especially adapted motor casing having complemental hand grips properly located at the inner end, whereby to permit the complete device to be accurately controlled and pushed along in contact with the body portion of the sheet while making a predetermined cut.

Additional novelty resides, it is believed, in the bottom formation of the motor housing or casing wherein this comprises a flat plate having longitudinally disposed transversely arranged idling rollers relatively arranged and positioned to provide the desired free running contact of the machine with the sheet acted on.

The principal expedient, however, constituting the essence of the invention may be referred to as the duplex cutter assembly including appropriate fixtures or accessories to provide a finished and reliable cutting action.

Other features and advantages will become more readily apparent from the following description and the accompanying pictorial drawings.

In the drawings, wherein like numerals are employed to designate like mechanical parts throughout the same:

Figure 1 is a side elevational view of a device constructed in accordance with the principles of the present inventive conception;

Figure 2 is a top plan view of the arrangement depicted in Figure 1, the cutter guard being omitted for clearness of illustration of parts;

Figure 3 is a bottom plan view of Figure 2;

Figure 4 is a side view with portions broken away and shown in sections to disclose the motor and transmission gearing;

Figure 5 is a front end view, that is, a view observing Figure 2 in the direction from left to right;

Figure 6 is a cross section taken approximately on the plane of line 6—6 of Figure 1;

Figure 7 is a detail view of the attaching hanger bracket for the secondary or lowermost cutter disk;

Figure 8 is a detail view of one of the cutter disks.

Attention is first conveniently invited to Figure 4, which taken in conjunction with the other figures, will show that the longitudinally elongated cylindrical motor casing or housing is designated by the numeral 8. This comprises a cylinder which is open at opposite ends. The inner end is closed by a substantially semi-spherical cap 9 carrying an appropriate handle or hand grip 10. This is provided with a suitably constructed electric switch 11, and the current conductor cable 12 is appropriately connected thereto. These features constitute a bodily detachable unit. At the opposite end the casing is formed with a screw threaded annulus or neck 13 to accommodate a screw cap 14 having appropriate bearings, one for the power take-off shaft 15 and the other for the motor shaft 16. These are geared together as indicated at the points 17 and 18. Incidentally, the motor, which may be of any appropriate style, is indicated at 19 and properly housed in the casing 8. On the top and just rearwardly of the center is a supplementary or additional hand-grip 20 and forward of this is a suspension eye 21. This is adapted to accommodate a cable or suitable hanger device (not shown) to facilitate handling the tool on a bench or elsewhere.

As before indicated, the motor casing includes a flat bottom plate 22 of general rectangular form having transverse longitudinally spaced slots to accommodate idling rollers 23. I have found it convenient to utilize three such rollers and to arrange them in proper relationship to suitably balance the machine so that it can be satisfactorily rolled along on the sheet of steel 24 as indicated in dotted lines in Figure 1.

I call attention now to a forwardly extending bracket 25 carried by the front screw cap, this having a lateral brace 26 to accommodate the bevel gear equipped end 27 of the power take-off shaft 15. The upper main cutter disk 28 is mounted for rotation on a shaft which is in turn journaled in a bearing in the bracket arm 25, said shaft having a beveled pinion 29 meshing with the first named pinion 27. The cutter disk is of appropriate dimensions and includes a beveled periphery defining the knife edge. The companion idling lower cutter disk 30 is located directly beneath the upper cutter disk so that its beveled marginal edge comes into proper relation with the corresponding edge of the upper disk to provide the desired sheet cutting or severing action. I have found it expedient and practical to provide a special adapter bracket having an attaching shank 31 bolted or otherwise secured to the bottom plate, the outer end of this being laterally offset as at 32 and then bifurcated so that the furcations 33 serve to accommodate the axle 34 carrying the cutter disk 30. The numerals 35 merely designate retaining nuts permitting the lower cutter disk 30 to be removably mounted in place.

It is to be noted that this double cutter disk assembly as a unit is mounted to one side of the longitudinal axis or dimension of the motor casing. Consequently this allows the motor casing and roller to be shoved along on the main or relatively stationary portion of the sheet 24 while the edge of the sheet is sheared off by the motor driven action of the two disks.

The operation and use of a cutting tool of this type is evident, it is believed, from the drawings and description, for which reason an explicit description is thought to be unnecessary.

While the preferred embodiment of the invention has been shown and described, it is to be understood that minor changes coming within the field of invention claimed may be resorted to if desired.

I claim:

1. A sheet metal cutter of the class described comprising a horizontally elongated motor casing, an electric motor in said casing, a control and guiding handle at the inner end of the casing, a laterally offset cutter disk assembly mounted on the outer end of the casing and operatively connected with the motor, and idling rollers on said casing adapted to permit it to be maintained in pulling contact with the sheet acted on.

2. In a structure of the class described, a portable casing having handle means, one end of the casing being provided with a screw threaded neck, a screw cap detachably connected with said neck, said cap having a concentric bearing, the motor shaft being mounted at one end in said bearing, said cap being further provided with an eccentric bearing, a power take-off shaft mounted for rotation in said eccentric bearing, gearing connection between said motor shaft and power take-off shaft, an outstanding bracket arm carried by said cap, a cutter disk including a shaft mounted for rotation on said arm, an operating connection between said cutter shaft and power take-off shaft.

3. In a structure of the class described, a portable casing having handle means, one end of the casing being provided with a screw threaded neck, a screw cap detachably connected with said neck, said cap having a concentric bearing, the motor shaft being mounted at one end in said bearing, said cap being further provided with an eccentric bearing, a power take-off shaft mounted for rotation in said eccentric bearing, gearing connection between said motor shaft and power take-off shaft, an outstanding bracket arm carried by said cap, a cutter disk including a shaft mounted for rotation on said arm, an operating connection between said cutter shaft and power take-off shaft, a special adapter bracket secured to the casing beneath said bracket arm, and a second cutter disk mounted for idling rotation on said adapter bracket, said disks having their cutting edges disposed in complemental cutting relationship.

4. A sheet metal cutter of the class described comprising a horizontally elongated motor casing having a flat bottom plate, a plurality of transversely disposed longitudinally spaced idling rollers carried by said plate and adapted for rolling contact with the material being acted on, a control and guiding handle at the inner end of the motor casing, a laterally offset cutter disk assembly mounted on the outer end of the casing, and a motor in said casing operatively connected with said cutter disk assembly.

5. In a structure of the class described, a motor casing having a substantially flat bottom plate provided with a series of transversely disposed equi-distant idling rollers for rolling contact with the work, an outstanding bracket arm carried by the frontal portion of the casing, and offset with respect to the longitudinal dimension of the casing and said rollers, an adapter bracket connected to the bottom of the casing and having a portion located beneath said outstanding bracket arm, complemental cutter disks mounted respectively on said outstanding bracket arm and adapter bracket, and a motor in said casing operatively connected with said cutter disks.

ALBERT R. HAVANAS.